(12) United States Patent
Flight et al.

(10) Patent No.: US 6,662,199 B1
(45) Date of Patent: Dec. 9, 2003

(54) METHOD AND APPARATUS FOR CUSTOMIZED HOSTED APPLICATIONS

(75) Inventors: John L. Flight, Santa Clara, CA (US); Edward S. Lau, Sunnyvale, CA (US); Michael S. Weston, Los Altos Hills, CA (US); Anders Wallgren, Los Gatos, CA (US); Philip C. Nelson, San Jose, CA (US); Pravins S. Kothari, San Jose, CA (US)

(73) Assignee: Printcafe Systems, Inc., Pittsburgh, PA (US)

( * ) Notice: Subject to any disclaimer, the term of this patent is extended or adjusted under 35 U.S.C. 154(b) by 319 days.

(21) Appl. No.: 09/718,788

(22) Filed: Nov. 22, 2000

Related U.S. Application Data (60) Provisional application No. 60/174,418, filed on Jan. 4, 2000.

(51) Int. Cl.[7] .................................................. G06F 7/00
(52) U.S. Cl. ..................... 707/704.1; 707/100; 707/101
(58) Field of Search ..................... 707/1–10, 100–104.1

(56) References Cited

U.S. PATENT DOCUMENTS

| | | | | |
|---|---|---|---|---|
| 5,987,432 A | * | 11/1999 | Zusman et al. | 705/35 |
| 6,006,216 A | * | 12/1999 | Griffin et al. | 707/2 |
| 6,026,390 A | * | 2/2000 | Ross et al. | 707/2 |
| 6,128,624 A | * | 10/2000 | Papierniak et al. | 707/104.1 |
| 6,144,970 A | * | 11/2000 | Bonner et al. | 707/206 |
| 6,151,601 A | * | 11/2000 | Papierniak et al. | 707/10 |

* cited by examiner

Primary Examiner—Greta Robinson
Assistant Examiner—Linh Black
(74) Attorney, Agent, or Firm—Blakely Sokoloff Taylor & Zafman LLP (57) ABSTRACT

A data storage and retrieval mechanism includes a base table to store attributes common to each of the customer-specific variants and a spill-over table to store customer-specific attributes for associated individual ones of the customer-specific variants, the attributes of the base table and spill-over table each sharing a common, human readable name-referencing scheme. The customer-specific variants provide for corporate personalization of data storage, retrieval, and input and output operations/presentations as well as workflows that use such data. The name-referencing scheme may utilize multi-part names for data objects and such names may be used by other applications within the hosted environment for creating workflows, visual representations of the workflows, and/or data forms. Preferably, workflows are customized to customer-specific variants and may be created by a workflow engine that segregates scheduled transactions according to processes described by the workflows into asynchronous operations when such transactions cause actions outside the hosted environment.

24 Claims, 5 Drawing Sheets

METHOD AND APPARATUS FOR CUSTOMIZED HOSTED APPLICATIONS

RELATED APPLICATION

The present application is related to and the applicants claim the priority benefit of a Provisional Application entitled "METHOD AND APPARATUS FOR CUSTOMIZED HOSTED APPLICATIONS" filed Jan. 4, 2000, by the present applicants assigned application No. 60/174,418.

FIELD OF THE INVENTION

The present invention relates to an-Internet-based Enterprise Resource Planning (ERP) tool that provides a common hosted environment for multiple users thereof while at the same time permitting individual user customizations for data representations, workflow representations and visual interfaces.

BACKGROUND

Enterprise resource planning (ERP) software applications have now been in use for several years. Generally, ERP applications handle a wide variety of planning, transaction processing and accounting functions in an integrated manner. While there is no standard definition of an ERP application, it is common for products in this category to handle sales and customer management, forecasting, master production scheduling, material requirements planning (MRP), rough cut capacity planning, production orders, product/material definition, purchasing, supplier management, inventory tracking and financial accounting, i.e., the complete gamut of activities within any business enterprise (hence the term ERP). Many ERP applications also support costing, human resources management, finite capacity scheduling (FCS), quality management and equipment maintenance. The defining characteristic of an ERP application then is its integration of information across many functional areas. In order to provide such integrated solutions, ERP systems tend to rely heavily on databases.

Databases are computer-based record keeping systems. Stated differently, a database is a combination of computer hardware and software that acts together to allow for the storage and retrieval of information (data). Modern databases grew out of older information storage and retrieval systems. For example, early computer-based file systems allowed for record keeping in the form of familiar rows and columns known-as tables. The rows were referred to as records and the columns were known as fields; in order to find a particular piece of information a user browsed through the table and then extracted the needed field or fields from the desired record. So-called "keys" provided more immediate access to information by operating as a sort of index to the data stored in the table.

As the volume of data stored in computer-based systems increased, more flexible storage models (databases) were created. Databases allow for the sharing of data among multiple users through manipulation of user interface tools or command line interfaces that handle the storage, retrieval and modification of the data. Some databases are analytic in nature, providing mainly historical data that is not subject to modification, while others are more operational, in that they allow for managing dynamic bits of data. Furthermore, databases can be segregated by the way in which they model the data stored therein.

Hierarchical databases define relationships among different bits of data according to a hierarchical or tree-like structure. In such databases, a single table acts as a "root", and all other tables in the database somehow depend from that root table. Thus, tables at various levels of the hierarchy may be parents of lower-level child databases, while at the same time themselves being children of some higher-level parent table or the root table. The root table is then defined as a table with no parent tables. In a hierarchical database, a child table may have only one parent, but a parent can have many children.

Network databases are another form of database and allow for child tables to have multiple parents and parent tables to have multiple children. Such a structure can avoid data redundancies that might otherwise exist in hierarchical databases. Unfortunately, network databases can be complex to develop and maintain.

Recently, relational databases have become popular. At the core of the relational database model are the familiar tables (also known as relations) made up of records (rows or tuples) and fields (columns or attributes). Where or how the various tables of a relational database are stored makes no difference. What does matter is that any table can be identified by a unique name and that name can thus be used to locate the table. This different from the hierarchical or network models, which require that users know where in the various trees a particular piece of data is located.

In relational databases, operations that manipulate (i.e., store, retrieve or modify) data do so on the basis of the data values themselves. Thus, if a users wishes to retrieve a row from a particular table, he or she does so by comparing the value stored within a particular column for that row to some search criteria. Also, tables can store not only actual data, they can also be used a means for generating meta-data (data about the table and field names which form the database structure, access privileges to the database, data validation rules, etc.). Thus, relational systems can use operations recursively in order to provide information about the database.

Relational databases are often searched using a so-called structured query language (SQL). SQL provides the structure and idioms needed to query a relational database in a platform-independent fashion. Rather than referring to data as a set of pointers, the SQL provides predefined procedures that allow users to use any value in a table to relate to other tables in a database. Most modem relational databases are SQL databases that are composed of a set of row/column-based tables, indexed by a "data dictionary". To access data in the tables, users employ the SQL to navigate the database and produce "views" based on various search criteria defined in a query. The data dictionary is a catalog maintained by the database that includes a list of all the tables in the database and pointers to their locations in the storage medium. When an SQL query is made, the database looks up the table referred to in the query in the data dictionary in order to know where to go to execute the search. The data dictionary itself, however, cannot be queried directly.

An SQL query is generally made up of several parts. First is a query type, for example SELECT, that defines the type of action requested. Next, the location from which the data is to be retrieved must be specified. Finally, the search criteria which defines the type of information being sought is set forth. In response to the SQL query, the database consults the data dictionary and then accesses the table from which the data has been requested to put together a view. The view is essentially a dynamically generated result table that contains the data retrieved from the table specified in the query according to the user-provided search criteria.

ERP systems that rely on relational (e.g., SQL) databases are common in manufacturing and other environments today. However, one serious drawback of such systems is the need for labor intensive customization at the time such systems are established. For example, for each business in which a particular ERP system is to be established, the underlying tables will have to be uniquely tailored to that business' work processes. Furthermore, the various user interfaces (e.g., so-called wizards), data entry and retrieval forms, data formats, and workflows will likewise have to be customized to the business. Because modern ERP applications are complex software tools, it is likely that the business purchasing the system will not have the in-house expertise needed to undertake this customization process. Hence, in addition to the capital expended to purchase the ERP application tool itself, the business will have to hire outside contractors to perform the customization and then train the business' own employees on the use and operation of the system. This represents a significant cost to the business owner and also means that the customized ERP system is not transportable to other end-users.

An additional shortcoming that results from the need for such business-specific customization of existing ERP tools is that such products cannot be easily ported to Web-based (i.e., hosted) environments. To understand why this limitation exists, consider first that many traditional desktop-based applications software packages are today being replaced (or at least supplemented) by Internet-based solutions. One advantage provided by the Internet-based solutions is the availability of immediate upgrades. Thus, users are no longer faced with the task of installing new variants of the software packages they use for word processing, spreadsheet manipulation and other tasks. Instead, by accessing Internet-based forms of these tools, users have immediate access to the very latest versions of the tools and can take advantage of their latest features.

One reason why desktop applications can be readily transported to Internet-based (i.e., hosted) environments is that all users are expected to use the products in the same way. No (or very little) provision is made for user-customization. However, this is not true of the ERP systems described above. Because each business will have specific requirements for their respective data formats (schemas), work flows, user interfaces and other business processes, the simple "one size fits all" model of the hosted desktop applications simply does not apply. Accordingly, what is needed is a new model for providing hosted environments for ERP-type software applications.

SUMMARY OF THE INVENTION

An operating system or other software application for a computer system provides a hosted environment for one or more customer-specific variations of a data storage and retrieval mechanism that includes one or more base tables to store attributes common to each of the customer-specific variants and one or more spill-over tables to store customer-specific attributes for associated individual ones of the customer-specific variants, the attributes of the base tables and spill-over tables each sharing a common, human readable name referencing scheme. The name referencing scheme may utilize multi-part names for data objects stored in either of the base tables or the spill over tables (or even business rules and/or external data sources) and such names may be used by other applications executing within the hosted environment for creating workflows and/or visual representations of the workflows and/or data input/output forms. Preferably, any such workflows are customized to individual ones of the customer-specific variants and may be created by a workflow engine that segregates transactions to be performed according to processes described by the workflows into asynchronous operations when such transactions cause or initiate actions outside of the hosted environment.

In a further embodiment, a computer-hosted environment provides applications for a number of users. Each application is built on one or more databases having various common aspects across the numerous users and configured to be customized so as to offer each of the numerous users personalized data formats, process formats and/or visual representations for the data formats and/or process formats. The data formats may include data objects referenced by multi-part names, the structure of which is preferably common across logical storage locations within the computer-hosted environment. The process formats may be created to mask indications that actions that have effects outside of the computer-hosted environment are performed asynchronously, and the visual representations of the process formats or the data formats are preferably created so as to show only those transactions that require user action be taken or only those transaction that are permitted to be shown. In some cases, the visual representations may include forms to capture data objects to be stored in the data formats, the forms having corresponding form handlers that utilize the multi-part names to reference the data objects being solicited.

Yet another embodiment provides a data representation scheme for a computer database that includes base tables and spill over tables which allows for customization of the database for multiple users thereof. The data representation scheme includes the use of multi-part names, the structure of which not only allow for references to objects stored in the base tables but also to objects stored in the spill over tables. Thus, a computer-application that includes a workflow engine may be configured to access data objects stored according to the data representation scheme using the multi-part names. Such an application may also include a second engine for constructing visual representations of such workflows, and the second engine may also be configured to store within or retrieve from the data representation scheme the data objects, i.e., using the multi-part names. Preferably, such a computer application is instantiated in a hosted environment accessible by a number of users, e.g., via the Internet.

Still another embodiment provides a computer-implemented method wherein values of fields common to two or more user-specific variants of a data management process are stored in a shared base table; and values of fields that are not necessarily common to the two or more user-specific variants of the data management process are stored in a shared spill-over table. A common name referencing scheme may be employed to access values stored in either the shared base table or the shared spill-over table. Thus, such a process may be instantiated in a computer application hosted at a computer resource (e.g., a server) accessible through the Internet. The storing processes may be accomplished by soliciting the values to be stored through visual interfaces that have an associated handler application (e.g., a form handler) that references data objects to which the values pertain through the common naming scheme. This common naming scheme may involve the use of multi-part names.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for providing a hosted environment for complex software applications, such as ERP applications that rely on databases, is disclosed herein. This scheme includes support for extending underlying data models to manage enhanced attributes of data objects, the ability to modify and enhance user interface screens (including input and output displays and the wizards that assist in creating more complex data objects), and the ability to modify workflows to specify which team members should be taking what actions during specific stages of the procurement and/or business process. These capabilities allow unique enhancements for each customer (user) of the hosted software applications without the need for modifying the underlying database schema or application code and without requiring a unique instance of the applications per customer. Although discussed with reference to certain illustrated embodiments, upon review of this specification, those of ordinary skill in the art will recognize that the present scheme may find application in a variety of systems.

Therefore, in the following description the illustrated embodiments should be regarded as exemplary only and should not be deemed to be limiting in scope.

One term that will be used to describe the present scheme is "corporate personalization" of a software application. As used herein, the term corporate personalization is meant to refer to the process and/or end result of customizing one or more software applications, such as ERP tools, to reflect a particular business' schemas, data formats, views, visual representations of data and workflows, the workflows themselves, wizards for building workflows and/or end products, and the other characteristics of how a business manages information. This concept goes beyond simply remembering a particular user's preferences for information presentation (e.g., as may be available at some Internet-based portals through the use of cookies and the like), rather it is the broader idea of providing a truly custom environment for a business and its work processes, as can be expected from the sort of business-specific customization that ERP tools vendors often provide on a manual, business-by-business basis to those that purchase their software applications.

In addition, the present application assumes that a reader will have some familiarity with the Internet as it currently exists. Briefly, the Internet is a vast and expanding network of computers and other devices linked together by various telecommunications media, enabling all the computers and other devices on the Internet to exchange and share data. The Internet provides information about a myriad of corporations and products, as well as educational, research and entertainment information and services. A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). The precise hardware configuration of the hosting resource is generally not critical to the present invention, nor are the precise algorithms used to implement the services and methods described herein. Instead, the focus is on the nature of the services provided by the hosting resource.

In most cases, the hosting resource may be embodied as hardware and/or software components of a server or other computer system that includes an interface module, which allows for some dialog with a user, and that may process information through the submission of Web forms completed by the user. Generally, such a server will be accessed through the Internet (e.g., via Web browsers) in the conventional fashion. Operating in conjunction with the interface module may be a communication interface that supports the distribution of electronic mail (e-mail) messages to or from other Web sites or users.

One way to establish a presence on the Internet is by placing a Web page, which is, ultimately, a computer data file, on a host operating a Web server. When the Web server receives an inquiry from the Internet, it returns the Web page data in the file to the computer making the inquiry. The Web page may be a single line or multiple pages of information and may include any message, name, word, sound or picture, or combination of such elements. More complex Web pages may be generated "on-the-fly". So-called dynamically generated Web pages (also known as active server pages) may display information (e.g., according to a predetermined set of framing or display instructions) that is retrieved from one or more databases in response to user inputs or requests. Further, some Web pages may act as information collection vehicles and are therefore referred to as Web forms.

In general, a form is a collection of form fields displayed as a Web page by a browser in response to hypertext mark-up language (HTML) tags and other information received from a Web server. An associated form handler resides at the server to collect and process the information submitted by a user via the form. By using such forms, an information collection process performed by a host is made interactive with the users thereof. That is, users can add text to text boxes, select from drop down menus and/or select check boxes and/or radio buttons, etc. Typically, the user submits the form by clicking on a "submit" button or other appropriately labeled element of the form and, upon such submission, the contents of the form are passed to the form handler. Depending upon the type of information being submitted and the type of form handler being used, the information submitted by a user may be appended to a file maintained by the host, for example a file associated with a temporary account assigned to the user or a larger database. In this way information may be collected, processed and displayed to those who access it.

A text box is a standard form field into which a user can type text. When a form containing a text box is submitted in a Web browser, the name and contents of the text box are provided to the form handler running on the server. A check box field is typically arranged in a grid or matrix fashion with one or more cells of the matrix including a check box. Check box fields present a user with choices that can be made by clicking (e.g., selecting or deselecting as appropriate) a check box. Such fields are created and rendered using programming techniques common in the art and any number (including all or none) of individual check boxes may be selected or not. When a user submits a form containing a check box field, the name of each check box along with its value is provided to the form handler at the host. Radio button fields present a user with a choice that can be made by selecting a button. Radio buttons are displayed in a set, only one of which may be selected at a time. When radio button fields are created, they are assigned a group name, and each button in the group is assigned a value and an initial state (selected or not selected). When the user selects one of the buttons in the field, all other buttons in the field take on a value of not selected. Then, when the user submits the form, the group name and value of the buttons is provided to the corresponding form handler at the server for processing. The use and implementation of these and other components of Web forms to provide individualized input/output graphical user interfaces is one aspect of the present invention.

As indicated above, one of the problems with porting ERP applications to hosted (i.e., Internet-based) environments is the need for individual customization on a business-by-business basis. The present scheme allows for such customization by incorporating a flexible software engine that is resident at a Web server. This software engine allows for customization of data representations or schemas, process or workflow representations and visual representations of data input and output. Thus, multiple businesses may have ERP-type applications hosted at the single server (which may of course include redundant elements for fail safe operation), each being uniquely tailored to a particular business' needs.

For example, the software engine provides a mechanism for customizing data representations (schemas) for various users. Currently, two basic choices are available for representing data: the familiar table layouts discussed above that are popular with relational databases, and object-relationship mappings that are used with so-called object-oriented databases. The present scheme adopts somewhat of a hybrid data representation technique and uses a base table for storing/representing information that can be expected to be common to a number of end-users (e.g., businesses) and an auxiliary or spill-over table that can be individually customized for each user (business) on an as-needed basis.

Figure 1:
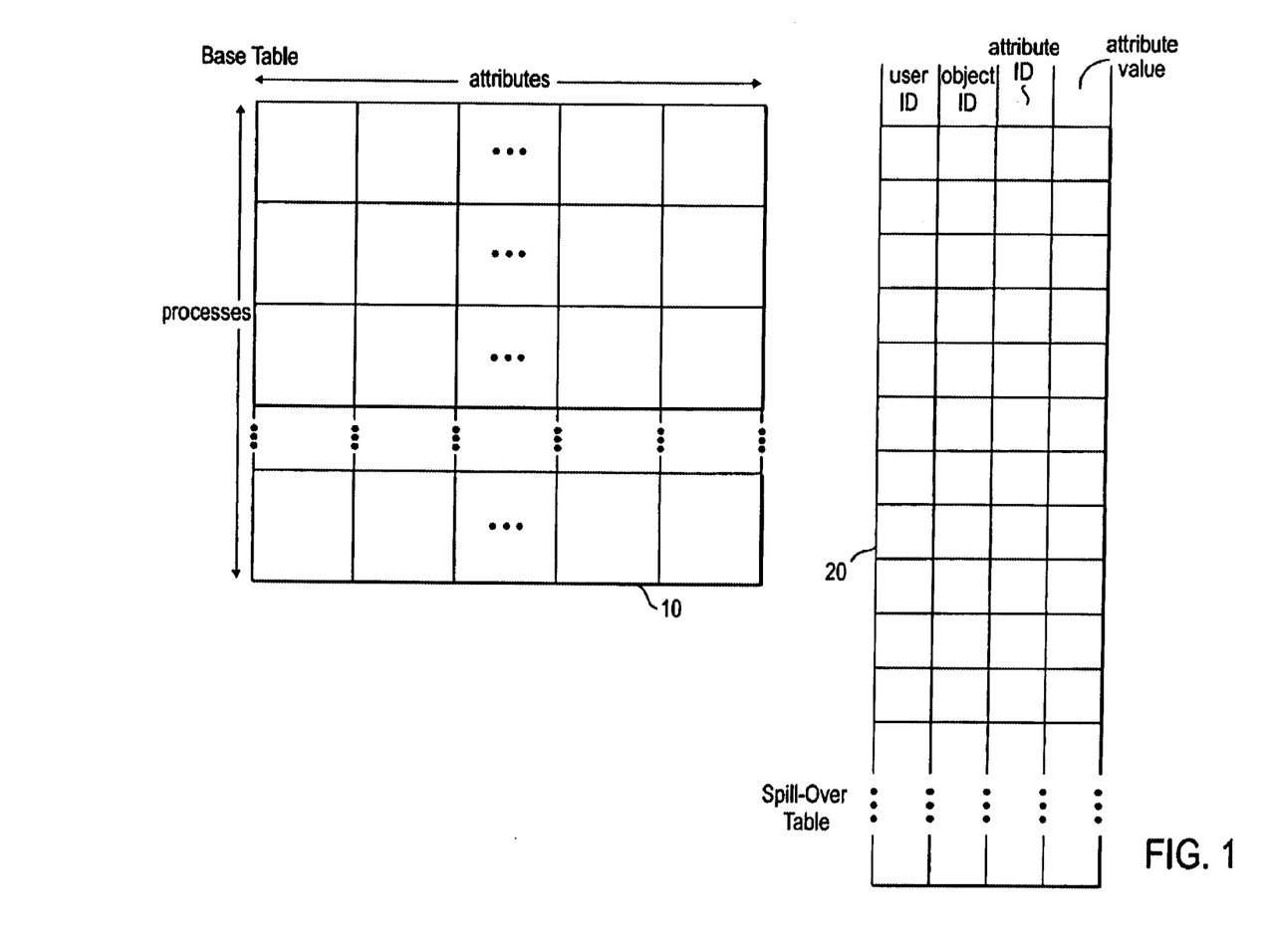
FIG. 1 illustrates one example of a base table and spill-over table configured in accordance with an embodiment of the present invention.

FIG. 1 shows an example of these tables (note, it should be understood that the illustration of the tables is for convenience only, when stored on a computer readable medium, the data that makes up such tables may be stored in any convenient representation and/or format, which to some extent may depend upon the particular operating system being used). One or more base table(s) 10 (or sets thereof) include(s) various processes and attributes in the familiar fashion for tables used in relational databases. One or more spill-over table(s) 20 (or sets thereof) include(s) columns for a security identification (ID), object ID, attribute ID and attribute value. The attribute IDs and values of spill-over table 20 can be any user-desired criteria, thus allowing for customization and differentiation between users. Associated with these tables is a data dictionary that relates the attribute IDs to unique, user-specified. multi-part names.

To understand how these tables allow for the type of corporate personalization described above, consider the following. Suppose a number of print shops each wish to use an ERP tool that is associated with a host accessible through the Internet. Each of these print shops can expect to receive customer requests for different types of print jobs (e.g., books, tri-fold brochures, etc.) that require different printing processes and materials (inks, papers, etc.) and which, therefore, each require different types of information to be specified in order to cost the job, etc. It can be expected that each of the print shops will have different ways of requesting and representing this data. That is, each of the print shops may have different data entry and data capture forms, different names for similar items or processes and different data output requirements. Indeed, it is the sum total of such differences that often differentiate one business from another.

With existing ERP systems, each of the print shops would be expected to have unique customizations of the ERP tools that suit each particular print shop's needs. The idea of using a common, hosted tool simply would not make sense to the print shop owners, because it would mean a loss of the individualization that has come to be associated with their business' operation. However, the present scheme is able to accommodate these customization requirements even in a hosted environment.

The base table 10 is established with attributes that can be expected to be common to all end-users. For example, it is likely that all of the print shops will have a "date" field for specifying the print jobs. Thus, if the base table is referred to as a "project" table, all the print shops can be expected to have need for a "project.date" attribute. The base table 10 is configured to accommodate all such common attributes for all users.

The spill-over table 20, on the other hand, need not have any predefined fields. Instead, it is a flexible resource that allows for individual user customization as needed. So, if one of the print shops requires an attribute associated with the weight of the paper to be used for a specified print job, such a field can be defined. If another of the print shops requires that a field for capturing the color of paper to used, such a field can be defined for that user. The spill-over table 20 is thus expandable to accommodate the unique customizations of the individual users and/or groups of users (i.e., such personalizations may be organized into domains or groups that are shared across multiple users and, in some cases, may be inherited within subgroups or across groups of these domains).

Importantly, the spill-over table 20 is accessed in the same way as the base table 10. That is, the spill-over table 20 may be accessed using the same multi-part name designators as are used for accessing information stored in base table 10. The multi-part names define relationships between data objects (and in some cases, non-data objects such as business rules) and may do so in human-recognizable form so as to clearly show those relationships. So, if "project.date" can be used as a name to access the date information for a specified project from base table 10, "project.paper.weight" may be used to access the custom field for the weight of paper to be used for the project from spill-over table 20. Stated differently, the base table 10 and spill-over table 20 may be accessed using queries that resemble SQL queries, but which allow for the use of multi-part names. The multi-part names have a common format regardless of whether the query is directed to the base table 10 or the spill-over table 20, thus the data retrieval process (in so far as it is directed to one table or the other) is invisible to the user. Thus, one need not know how/where the data is actually stored, but rather only its designator, in order to make use of it.

By providing a spill-over table 20, customizations that are made to accommodate one user do not affect other users.

That is, none of the fields of the base table 10 need be altered in order to provide a custom environment for each of several users of the ERP or other tool. Rather, simply providing the necessary attributes in the spill-over table 20 can accommodate any and all custom data representations. It is because the basic format of the base table 10 remains unaltered that the present scheme allows for what would otherwise be completely custom installations of a common software application to be a single hosted application shared among a number of users that nevertheless demand custom variations.

As indicated above, one of the advantages offered by the present invention is the use of a common naming scheme for entries in the base table 10 and spill-over table 20. This allows users to write scriptable forms/workflows that reference objects by those names. So, a user could write a query that asks for all of the "a" attributes of a particular object. Upon receiving such a query, the engine will consult the data dictionary to determine which table to retrieve the associated value from.

Figure 2:
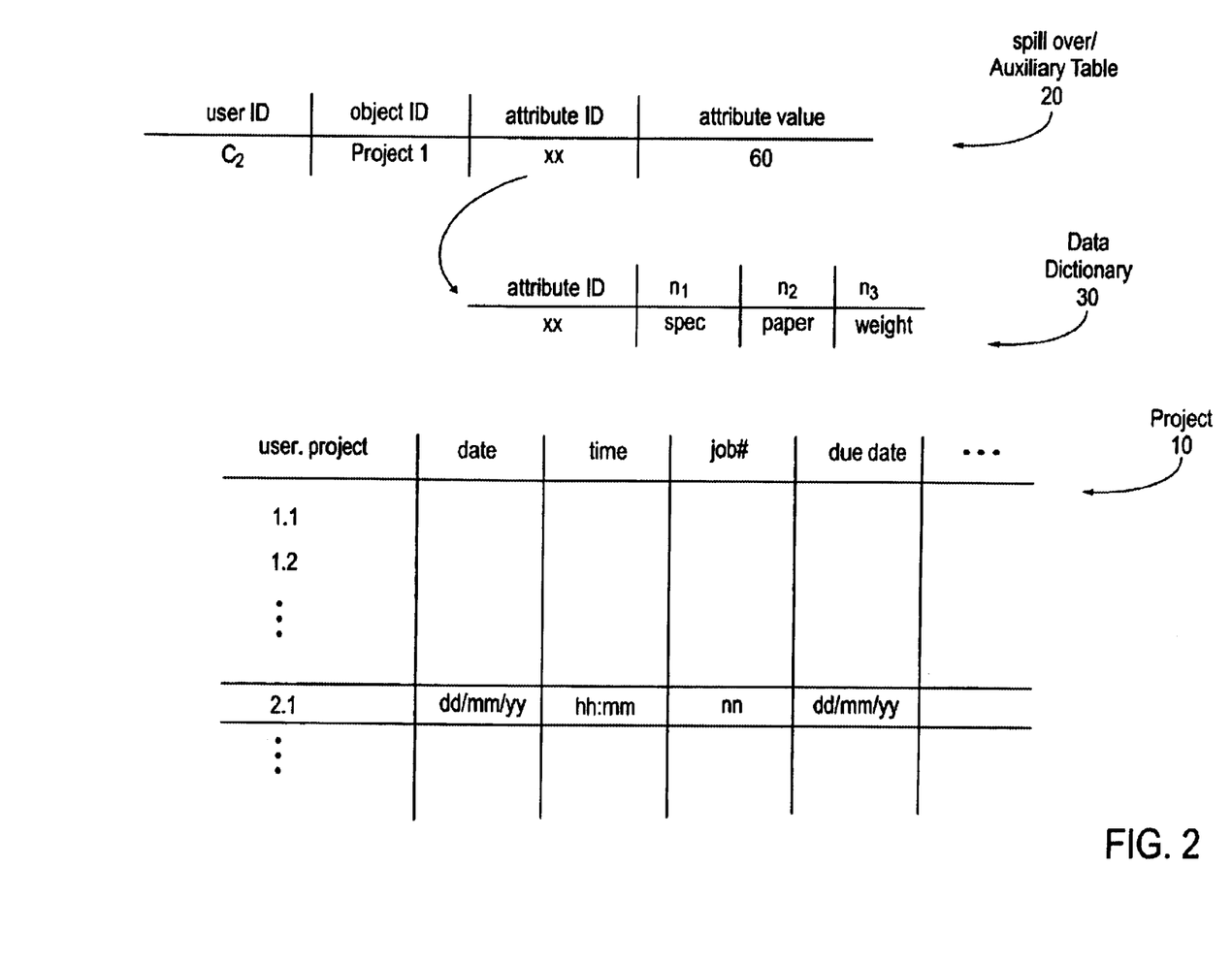
FIG. 2 illustrates a further example of portions of a base table, spill-over table and data dictionary configured in accordance with an embodiment of the present invention.

For example, consider a situation where a base table 10 is designated as the "project" table. The project table includes fields such as date, time, job number, and due date. One particular customer (e.g., a print shop customer of the Web resource hosting the present application) may require that all jobs include a designation of the weight of the paper to be used. That customization may be captured in a row of the spill-over table 20 that resembles the portion of the spill-over table shown in FIG. 2. As shown, the base table 10 is shared by a number of users, each having entries for various jobs/projects. User number 2 ($C_2$) has a custom row in spill-over table 20 that captures information regarding the weight of paper used for project I (note in the project table 10, user 2, project 1 is captured by the designator 2.1 in the user.project field). This particular attribute (the paper weight (e.g., 60 lbs.), is identified by the label "xx". Label "xx" is defined in the data dictionary 30 to be spec.paper.weight (perhaps short for specification of paper weight). Thus, if a user runs a query for project.spec.paper.weight, the search engine associated with the present application will consult the data dictionary 30 and find that this name corresponds to an attribute ID "xx", which can be located in the spill-over table 20. The corresponding attribute value (60 lbs.) will then be retrieved. Using the common name referencing scheme thus makes the actual data storage invisible to the user, because the user need not specify the actual location of the data values being sought, only its/their name(s).

Figure 3:
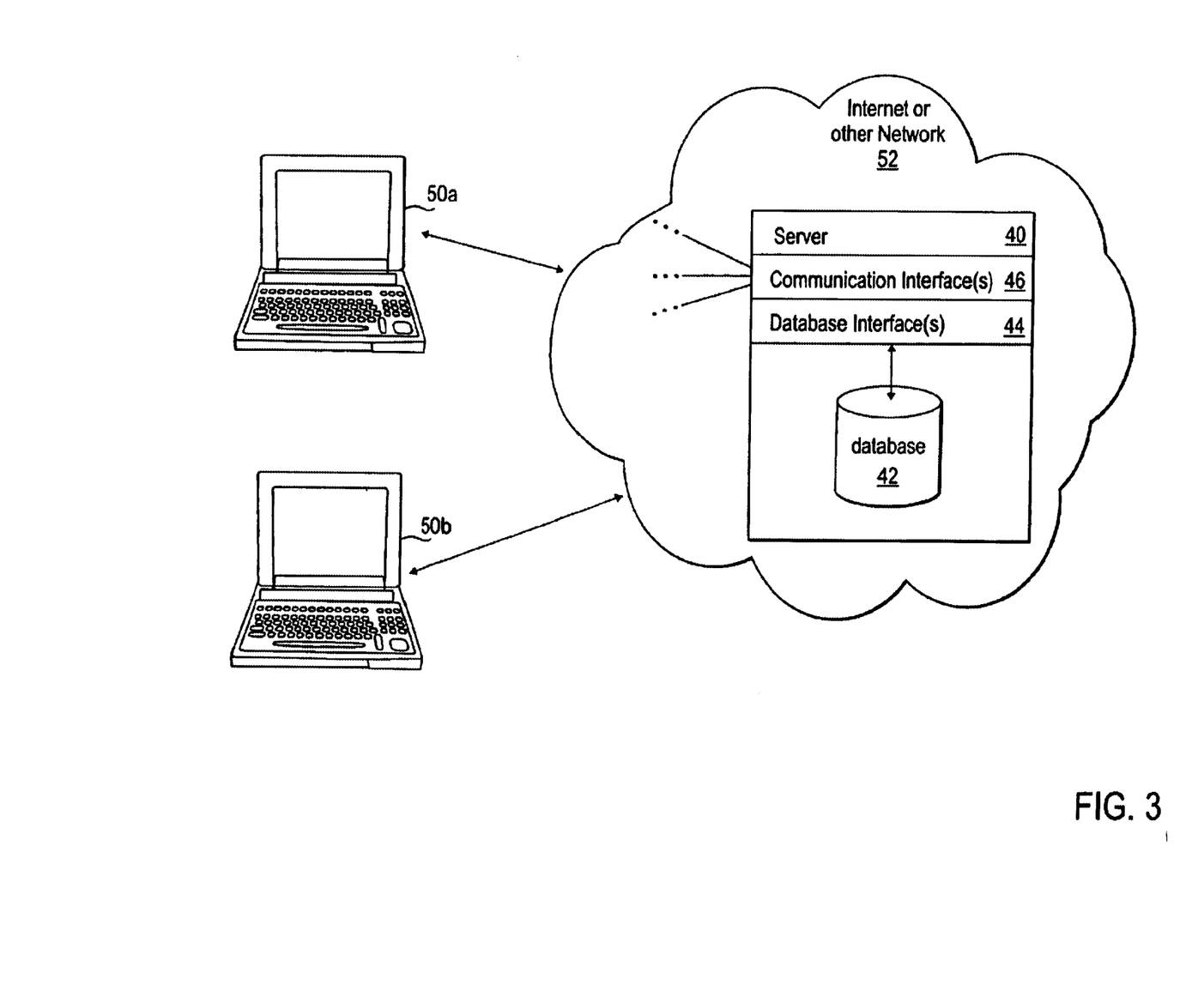
FIG. 3 illustrates one example of a computer system configured in accordance with an embodiment of the present invention.

The search engine that provides the above-described functionality may be embodied in computer hardware, software or a combination thereof. FIG. 3 illustrates one example of a computer system configuration that may be used in accordance with the present invention. Server 40 acts as a host for a database 42 that is organized in accordance with the present scheme. That is, through database 42, its related interfaces 44 and various communication interfaces 46 and operating systems (not shown), server 40 is configured to provide a hosted environment for one or more customer-specific variations of a data storage and retrieval scheme that includes a base table to store attributes common to each of the customer-specific variants and a spill-over table to store customer-specific attributes for associated individual ones of the customer-specific variants, the attributes of the base table and spill-over table each sharing a common, human readable name referencing scheme. In one embodiment, this system allows for storing values of fields common to two or more user-specific variants of a data management process in the shared base table; and storing values of fields that are not necessarily common to the two or more user-specific variants of the data management process in the shared spill-over table.

As shown in the figure, server 40 may be accessed by various users 50*a* and 50*b* through the Internet 52 or another computer network in the conventional fashion. Data entry and/or retrieval can be accomplished through the use of Web forms produced by server 40 and rendered on the client computer systems by Web browsers and/or similar software applications.

Figure 4:
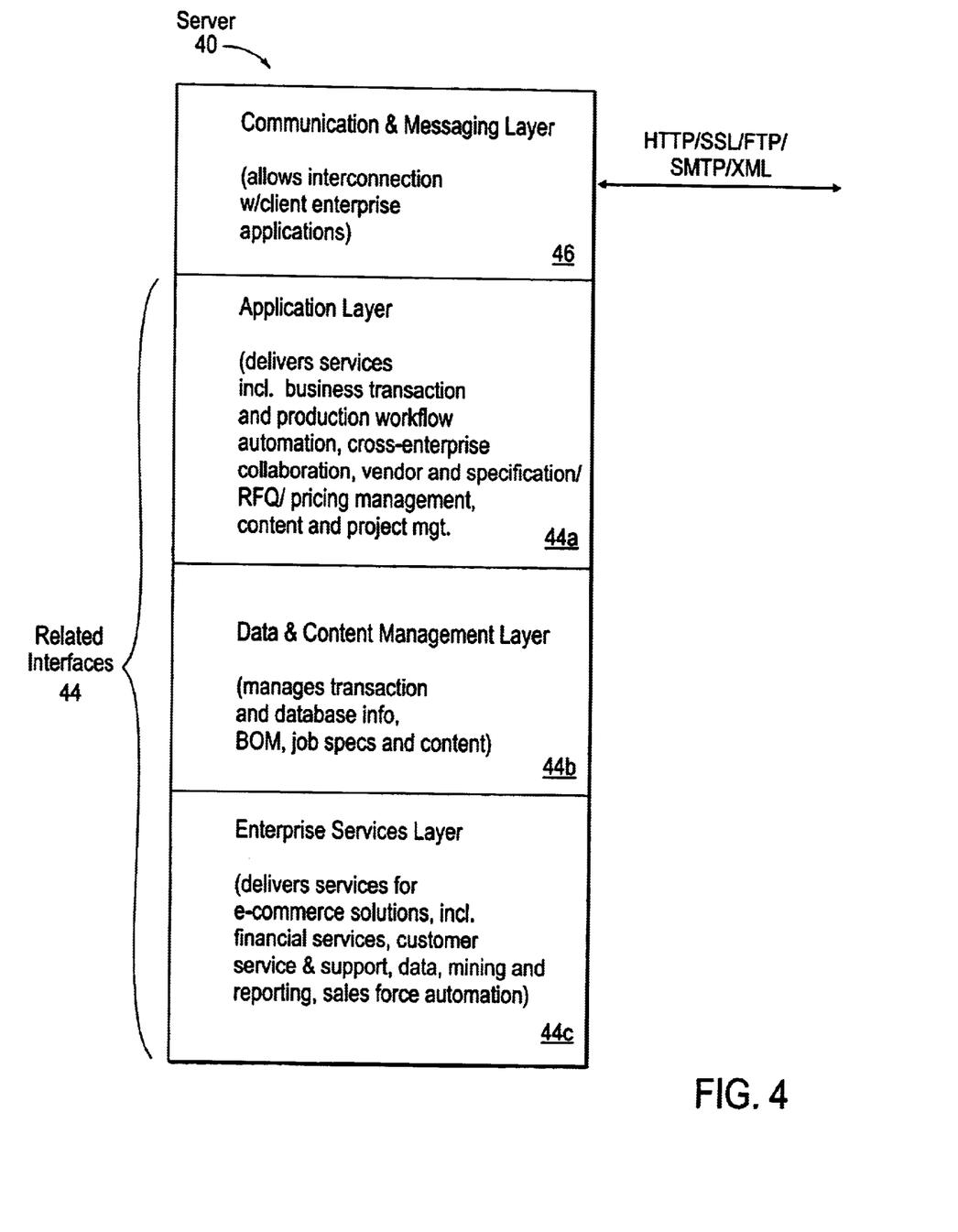
FIG. 4 illustrates various features of the computer system shown in FIG. 3 in further detail.

Further details of server 40 are shown in FIG. 4. In this illustration, the database interface 44 has been expanded to show various layers thereof 44*a*–44*c*. Application layer 44*a* is configured to deliver various services to users, including business transaction and production workflow automation services, cross-enterprise collaboration services, various vendor services and specification/request for quotation/pricing management and content and project management services. In general, as discussed below, these various services involve, to some degree, the generation of workflows (e.g., business processes) that are customized to various user applications. In addition, visual representations of these workflows (and the underlying data input/output that supports them) are also customized (or customizable) for each user within the hosted environment provided by server 40. These various customizations make use of the multi-part naming scheme and data organization schemes described above.

Data and content management layer 44*b* provides facilities for managing transaction and database information, bills of material, job specifications and content, etc. This is that layer that provides input to and output from the data organization scheme (i.e., the base and spillover tables) described above. Thus, this layer also makes use of the multi-part naming scheme.

Enterprise services layer 44*c* provides facilities generally useful for electronic commerce applications, such as financial services, customer support services, data mining services, sales force automation services and so on. These types of facilities have become common in the e-commerce community and need not be discussed in further detail. The services of this and the other layers are accessible to outside users through the communication and messaging layer 46 using common Web protocols such as HTTP (hypertext transfer protocol) for submission of Web forms and the like, e.g., with or without SSL (secure socket layer) encryption; bulk file transfers using FTP (file transfer protocol), e-mail communication with the operators of server 40 or the owners of applications hosted thereat using smtp (simple mail transfer protocol), and through requests/commands to the various applications submitted using XML (extensible markup language).

The workflows mentioned above are, essentially, representations of business processes (i.e., process formats). As such, workflows may describe order taking, order processing, manufacturing operations, order fulfillment and/or any other process engaged in by a business in providing its services to others. In traditional ERP systems, these workflows are highly custom representations that are painstakingly manipulated in order to conform to each individual user's business environment. Clearly, such unique instantiations are not well suited for typical hosted applications, nevertheless, each individual user will demand that its workflows accurately represent its business, and will not readily adapt its business to suite a preestablishsed form of a workflow.

Although it operates in a hosted environment, the present scheme does allow for personalization (e.g., on the corporate level) of workflows. In part, this is made possible by the unique data representation and storage model described above. By allowing each user to customize its database (without departing from the benefits of a hosted environment), the present scheme provides the underlying foundation for customized workflows as well. Indeed, some workflows may include actions that call or create other or further customizations.

Generating the actual workflows may be accomplished using a scheduler that is permitted to access the underlying database (e.g., to guide a workflow engine in the creation of the workflows). The rules that define the scheduler may, therefore, determine the criteria by which the work flows are produced. In some cases, generating the workflows may involve choosing any of a number of feasible routes defined by the model. However, in other cases, more sophisticated criteria for workflow generation, such as optimizing for cost, value or other (e.g., user-defined) criteria may be specified and workflows generated accordingly. Note that in conventional processes and applications, such workflow generation is generally performed according to rigid rules (i.e., by controllers which implement these rules for workflow creation). In the present scheme, however, a more flexible approach is adopted, allowing the true nature of the cross-enterprise application to be reflected. That is, in a real-world environment workflows may actually be executed out-of-order, but such execution should not be permitted to bring a system to a halt. The present scheme accommodates such eventualities and provides a flexible "recorder-prompter" environment wherein milestone achievements are noted but where they occur out of an expected order, the scheduler is not brought to a stop simply because prior milestones were not indicated as being completed (though prompting so that users may check on these milestone achievements may be provided).

Because of the hosted nature of the present application, several operational constraints must be met by the present workflow engine. For example, the workflow engine must behave synchronously in that user-initiated actions must be seen (or at least perceived) to have rapid (even near-instantaneous) effect. This is true because users have become accustomed to interacting with Web forms and other server-based tools in a near real-time fashion. Therefore, as users interact with a workflow, those users will expect some form of rapid feedback. This may be as simple as updating a form or it may require a more complex action such as generating a request for a quotation or a response thereto.

The workflow engine must also scale to very large proportions. Rather than merely serving one business' applications, the workflow engine of a hosted environment must be able to operate with a great many users' processes and applications. While this may be true of any Internet-based service, it is difficult to accomplish when dealing with complex applications that may be built on top of very large databases.

The workflows produced must be fully transaction-protected. That is, the workflows need to be protected against out-of-date or stale requests/data entries. Because the workflows execute within a hosted environment, it is quite possible that multiple users will be accessing the same workflow simultaneously and that in so doing, one user may render another user's inputs stale. The workflow must be flexible enough to recognize these out-of-date entries and robust enough to survive their input. Along the same lines, each transaction must be very short in duration, because during the transaction execution (i.e., when a database access (read or write) is being made), no other accesses should be permitted (e.g., to avoid the staleness problem). Because of the lock-out nature of these accesses then, unless the transactions are short, every concurrent user of the hosted environment will suffer from the actions of others in terms of delays in processing.

In addition to being short in duration, transactions need to be capable of being undone. This is especially true when transactions will have an effect on the external environment, such as by causing the transmission of an e-mail or other communication. Such actions themselves cannot be undone, so some transactions in the present application are broken into two or more asynchronous operations and queued for execution. That is, all actions (whether user initiated or otherwise) that have external effects associated therewith are broken into stages and each stage is placed in a queue by a workflow engine. A request is committed with the rest of the transaction and following the actual execution of the external effect (e.g., as indicated by the updating of the database), which may be performed by a program daemon, an acknowledgement is returned to the workflow engine.

In addition to the above, in order to provide true "personalization" for the various users, the present workflows are generated in such a way so that the "next steps" to be performed in accordance therewith are dynamic and not static. That is, the next steps are not simply pregenerated and presented at an appropriate time (as may be the case where a typical Web user is interacting with an electronic storefront purchasing process), rather, these actions are determined "on-the-fly" as the workflow is executing and in accordance with the actual data objects retrieved from the database. Stated differently, the interfaces generated from the workflows are dynamically calculated from the executing process so as to provide a truly an customized experience for each user/data object/workflow. Thus, the workflows themselves may become the genesis of further customizations (or corporate personalizations) unique to each business, group or businesses or user(s).

In this way then, the workflows provide explicit guidance to a third component of the present scheme, namely a user interface generation component. This guidance in what interfaces to present to a user and when to present them is provided, in part, by the workflow engine which is configured to group logical nodes of a business process into a transaction, rather than simply displaying every possible node (decision points) as may be done with conventional workflow engines. By reducing the workflow nodes to meaningful transaction points, the workflow engine can instruct the user interface engine to only display those nodes where meaningful input is needed/desired. That is, by presenting only meaningful outputs, the workflow engine aids in the decision-making process by requiring only meaningful inputs from users.

This type of customization (which may be provided at the group, or even subgroup or individual user within a group, level) provided by the workflow engine goes far beyond merely personalizing a color scheme or other non-substantive artifact to match a user's preferences as may be done in some Web-based consumer applications. The type of customization provided by the present scheme is that achieved by generating an entirely new workflow for completing a job, as well as the visual representations used to describe that process and to solicit input. By way of example, consider a conventional workflow that many people are familiar with—that of checking out from an electronic store. After selecting one or more items for purchase (and perhaps placing them in an electronic shopping cart), a user typically arrives at a Web form configured to solicit his or her delivery instructions and payment information. True, sometimes these are broken up into two or more forms, but the basic processes remain the same: select items for purchase; provide instruction on where and how to effect delivery; and provide payment information. Now, some sites may offer personal touches such as storing a user's previous delivery and/or payment information but the overall process of completing the sale (i.e., the workflow) does not change regardless of who the user is.

While this scheme may work (and may even work well) for business-to-consumer applications, it will not work for business-to-business applications where the hosted resource provider demands that all businesses fit their workflows into some preestablished notion of how to conduct their business processes. Instead, individual businesses will demand that the hosted environment conform to the business' already established processes and not the other way around. This is partly due to the fact that businesses are used to having customized ERP applications and partly due to the fact that different processes often help businesses to set themselves apart from competitors.

The type of customization provided by the present application then, is of the form that allows one business to decide how its processes will be defined and visually represented and another business to make different implementations of these items, even though the two businesses may be interested in performing or achieving the same overall function or effect. By allowing the workflow engine to utilize the multi-part naming scheme described above, the workflow engine can dynamically access the data particular to each user's application, regardless of its physical storage location. Indeed, the storage location is invisible to the workflow engine because the naming scheme is common throughout all storage options.

The use of the multi-part naming scheme also carries over to the engine used to build the visual representations of the workflows and other items (e.g., data formats, etc.). The hosted environment is configured to provide different types of visual representation (also known as users interfaces), those that are descriptive of the data objects themselves, and those that allow for queries for information (e.g., Web forms, wizards, etc.). In addition, and as noted above, user interfaces that describe the workflow processes may also be generated to allow users to take action at appropriate times during the workflow execution. The user interface engine then may be thought of as means for determining how to generate the various visual representations.

Figure 5:
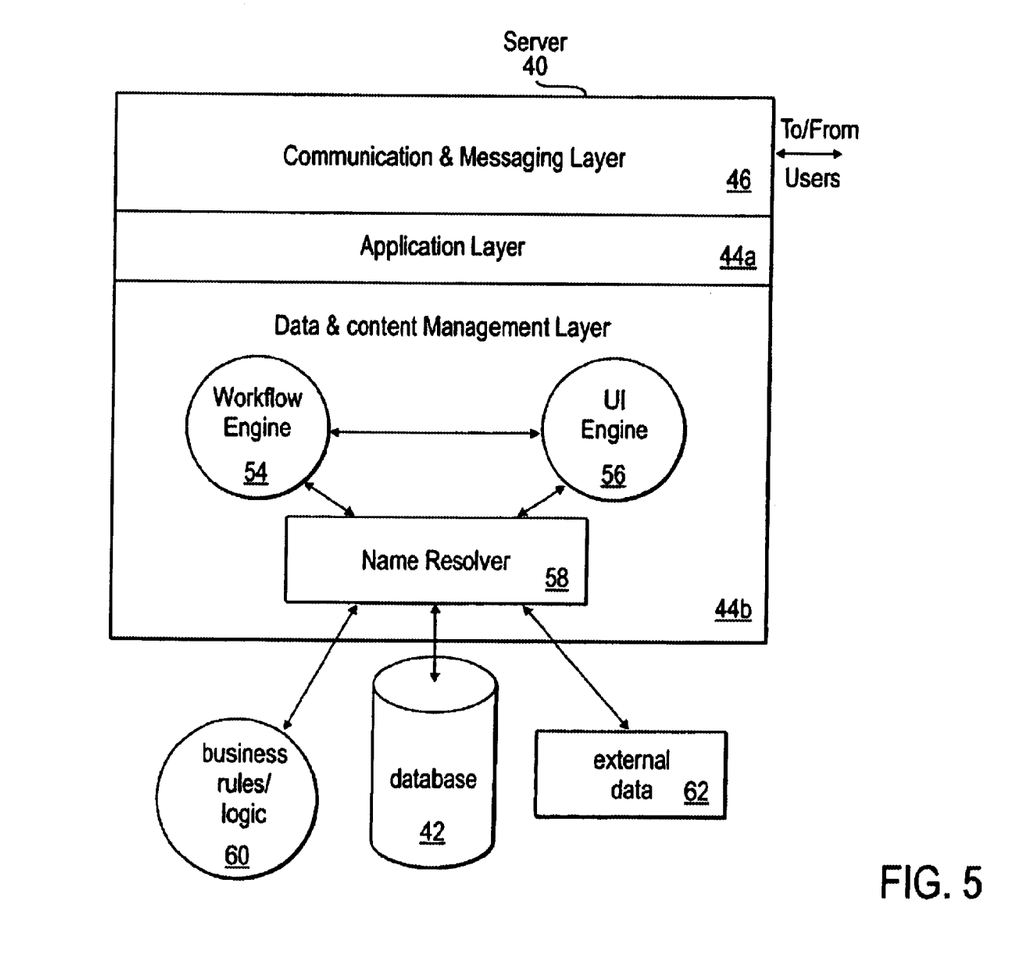
FIG. 5 illustrates additional features of the computer system shown in FIG. 4.

FIG. 5 illustrates the various communication paths between the workflow engine 54 and user interface (UI) or display engine 56 of the data and content management layer 44b and the common database 42. Each of these engines 54 and 56 is capable of accessing the database 42 through the use of the multi-part naming scheme described above and also communicate with one another to generate the visual representations of the workflows. Interestingly, the user interface engine 56 may be configured to allow for user-specified items to be represented not by absolute values but rather by estimates, recommendations or preferences. So too may tolerancing (e.g., "not to exceed xxx") support be provided. This adds flexibility to the present system.

The tolerancing described above can be achieved through the use of appropriate object type definition in a data dictionary, for example:

```
<ObjectType name="FloatPlus">
    <tolerance type="Long" />
    <singleValue type="Float" />
    <min type="Float" />
    <max type="Float" />
    <choices type="Float" isArray="true" />
</ObjectType>
<ObjectType name="PAPER">
    <name          type="String" />
    <manufacturer  type="StringPlus" />
    <brand         type="StringPlus" />
    <weight        type="FloatPlus" />
    <color         type="StringPlus" />
    <finish        type="StringPlus" />
    <grade         type="StringPlus" />
</ObjectType>
```

The above string is an example of computer executable instructions (i.e., the human-readable version of such instructions) that can be used to define a data object FloatPlus and allow for a values within a particular range of values (between a minimum and a maximum) to be set for that object. Note also that such objects can themselves be used in defining other objects (e.g., as is the case for the data object "PAPER"). Such instructions (along with instructions for implementing any or all of the above-described materials) may be stored in human- and/or computer-readable form on any computer-readable media at server 40.

Building a visual representation on the fly may be accomplished using instructions such as the following:

```
<Visual name="paymentTerms">
    <type value=menu />
    <datatype value=string />
    <label value="Payment Terms" />
    <width value=120 />
    <choices RefPath="theUser.payTerms" />
    <value RefPath="theQuote.paymentTerms" />
    <specvalue RefPath="theSpec.paymentTerms" />
</Visual>
```

For this example, assume that a form is being built to provide feedback on the payment terms responsive to a request for a quotation for a print job. As indicated, the "Payment Terms" label will be displayed at a defined width along with a menu of choices. Two choices for the payment terms will be offered: the terms from the specification (presumably provided by the requestor) and those from the actual quote (presumably provided by the print shop). Notice that rather than having preset values associated with these choices, the above form builder makes reference to data objects defined by multi-part names: theQuote.paymentTerms and theSpec.paymentTerms. These data objects may be stored in either a base table or a spill over table, the actual location is invisible to the form builder, but such is immaterial because the present application uses the multi-part names to provide references into both/either table.

Thus, if these are the names for objects stored in the spill over table, another print shop may have fields for similar values but may refer to them as customerPrice.terms and storePrice.terms. Although the values mean the same thing in these two examples, the different business are able to customize the application to their individual needs, and both applications can continue to use the same hosted environment because of the flexibility and customization options provided through the use of the multi-part naming scheme.

By generating forms and the like geared to the individual business' workflows, the user interface engine 56 can initiate the collection of data used to populate the underlying tables in the database 42. Thus, part of the user interface engine 56 will be a form handler- designed to parse a user response and apply the resulting input to the appropriate locations in the base and spillover tables, and this process is made easier through the use of the multi-part naming scheme. This scheme makes the actual storage location transparent to the form handler and so those individuals writing applications to be hosted in the present environment need not concern themselves with the underlying storage arrangement. Each application writer may treat the environment as completely custom, without regard for other application writers or other users that are doing likewise.

The workflow and UI engines 54 and 56 may access the database 42 through a name resolver 58. Name resolver 58 is configured to parse through the multi-part names presented by the engines and retrieve the requested information (e.g., data objects) from the appropriate source. Thus, name resolver 58 may locate and retrieve data objects form the database 42 (i.e., in one or the base or spill-over tables), or even from associated business rules/logic 60 or even sources of external data 62. The business rules/logic 60 may define how raw data is to be operated on to produce refined data for use by the workflow and/or UI engines, and/or how data is to be derived from/under existing conditions. The external data sources 62 may be external files or XML (extensible markup language) tags. Thus, through the use of the multi-part names, business objects and/or external data can be treated as if these materials were ordinary data objects. Also, different portions of the multi-part names may point to different things, so that the name resolver 58 may start with an entry in a base table of database 42 and find a pointer to a spill-over table therein, which itself may require that a result be returned from a set of business rules 60 before data can be returned to a requesting engine.

Thus a scheme for providing a hosted environment for complex software applications, such as ERP applications that rely on databases has been described. Although the foregoing description and accompanying figures discuss and illustrate specific embodiments, it should be appreciated that the present invention is to be measured only in terms of the claims that follow.

What is claimed is:

1. A computer system configured to operate under the control of a process, which when implemented by the computer system performs the steps of:
   providing a hosted environment for one or more customer-specific variations of a data storage and retrieval mechanism that includes one or more base tables to store attributes common to each of the customer-specific variants and one or more spill-over tables to store customer-specific attributes for associated individual ones of the customer-specific variants, the attributes of the base tables and spill-over tables each sharing a common, human readable name referencing scheme.

2. The computer system of claim 1 wherein the common, human readable name referencing scheme comprises multi-part names for data objects stored in either the base tables or the spill over tables.

3. The computer system of claim 2 wherein multi-part names are used by applications executing within the hosted environment for creating workflows and/or visual representations of the workflows and/or data input/output forms.

4. The computer system of claim 3 wherein the workflows and or visual representations of the workflows and/or data input/output forms are customized to individual ones of the customer-specific variants.

5. The computer system of claim 4 wherein the workflows are created by a workflow engine that segregates transactions to be performed according to processes described by the workflows into asynchronous operations when such transactions cause or initiate actions outside of the hosted environment.

6. A computer-hosted environment providing applications for a number of users, each application built on one or more databases having various common aspects across the numerous users and configured to be customized so as to offer each of the numerous users personalized data formats, process formats and/or visual representations for the data formats and/or process formats.

7. The computer-hosted environment of claim 6 wherein the data formats comprise data objects and/or business rules referenced by multi-part names, the structure of which is common across logical storage locations within the computer-hosted environment.

8. The computer system of claim 7 wherein process formats are created to mask indications that actions that have effects outside of the computer-hosted environment are performed asynchronously.

9. The computer system of claim 6 wherein the visual representations of the data formats and/or process formats are created so as to show only those elements which are permitted to be seen or only those transactions that require user action be taken.

10. The computer system of claim 3 wherein the visual representations include forms to capture data objects to be stored in the data formats, the forms having corresponding form handlers that utilize the multi-part names to reference the data objects being solicited.

11. A data representation scheme for a computer database, comprising:
    a base table and a spill over table which allows for customization of the database for multiple users thereof, the data representation scheme comprising multi-part names the structure of which not only allow for references to objects stored in the base table but also to objects stored in the spill over table, external data sources and/or business rules of the users.

12. A computer-application comprising a workflow engine and/or a display engine configured to access data objects stored according to the data representation scheme of claim 11 using the multi-part names.

13. The computer application of claim 12 wherein the display engine is configured to store within or retrieve from the data representation scheme the data objects, using the multi-part names.

14. The computer application of claim 13 as instantiated in a hosted environment accessible by a number of users.

15. The computer application of claim 14 wherein the users access the hosted environment via the Internet.

16. A computer-implemented method, comprising:
    storing values of fields common to two or more user-specific variants of a data management process in a shared base table; and
    storing values of fields that can be common or in addition to the two or more user-specific variants of the data management process in a shared spill-over table,
    wherein a common name referencing scheme is employed to access values stored in either the shared base table or the shared spill-over table, business rules and/or external data locations.

17. The method of claim 16 as instantiated in a computer application hosted at a computer resource accessible through the Internet.

18. The method of claim 16 wherein the storing processes are accomplished by soliciting the values to be stored through visual interfaces that have an associated handler application that references data objects to which the values pertain through the common naming scheme.

19. The method of claim 16 wherein the common naming scheme comprises the use of multi-part names.

20. The computer-hosted environment of claim 6 wherein various groups of the customizations are shared across multiple ones of the users.

21. The computer-hosted environment of claim 6 wherein two or more of the users are organized into groups which include subgroups thereof and various customizations are shared among the groups.

22. The computer-hosted environment of claim 21 wherein the customizations of the subgroups are inherited from parent groups thereof.

23. The computer-application of claim 12 wherein the workflow engine creates workflows which themselves call and/or create further customizations of the data objects and/or displays generated by the display engine.

24. The computer-application of claim 23 wherein XML is used for specifying the further customizations.

\* \* \* \* \*